No. 781,073. PATENTED JAN. 31, 1905.
G. HUTCHINSON.
MILKING MACHINE.
APPLICATION FILED SEPT. 3, 1904.
2 SHEETS—SHEET 2.
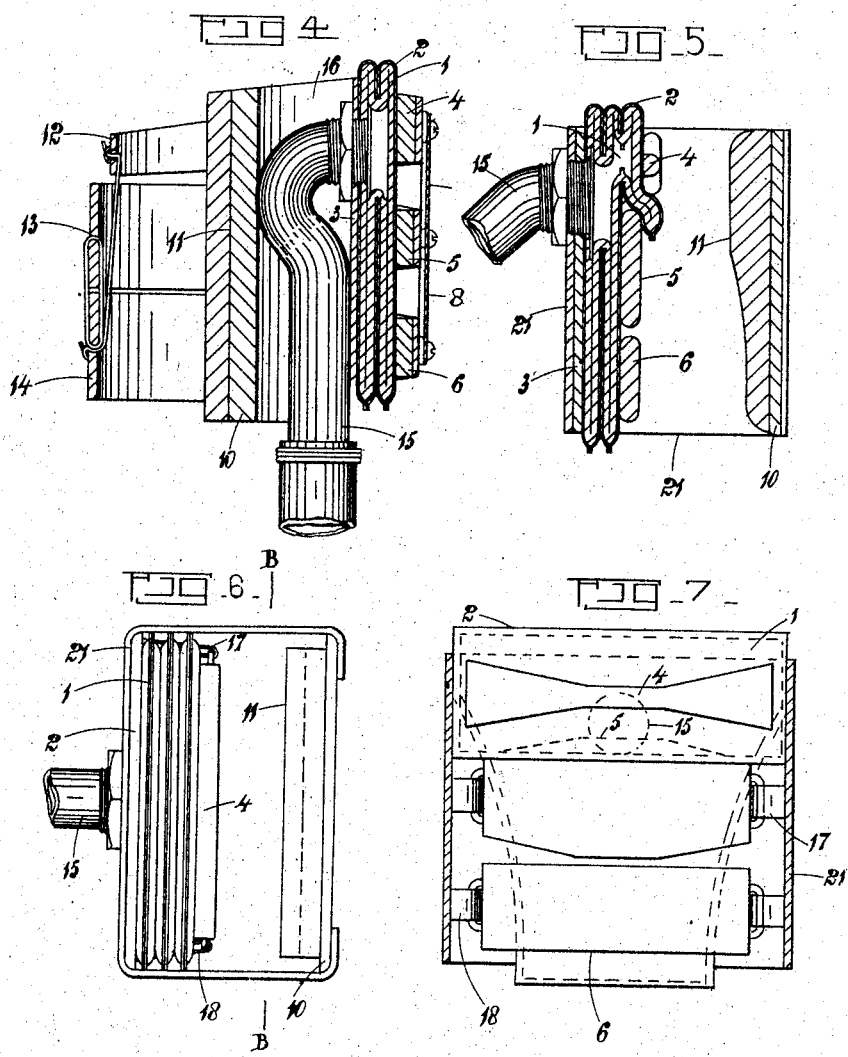

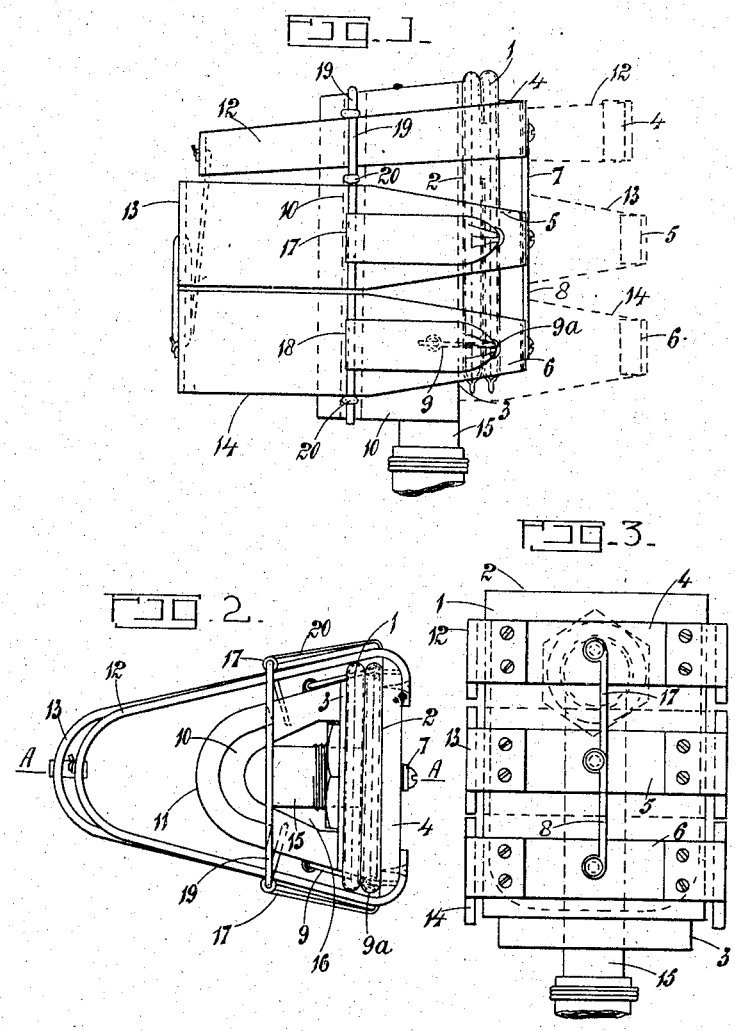

No. 781,073. Patented January 31, 1905.

UNITED STATES PATENT OFFICE.

GEORGE HUTCHINSON, OF SEATOUN, WELLINGTON, NEW ZEALAND.

MILKING-MACHINE.

SPECIFICATION forming part of Letters Patent No. 781,073, dated January 31, 1905.

Application filed September 3, 1904. Serial No. 223,282.

*To all whom it may concern:*

Be it known that I, GEORGE HUTCHINSON, schoolmaster, a subject of His Majesty the King of Great Britain and Ireland, residing at Seatoun, in the provincial district of Wellington, in the Colony of New Zealand, have invented certain new and useful Improvements in Milking-Machines, of which the following is a specification.

This invention relates to apparatus employed for milking cows, in which fluid under pulsative pressure is used in teat-presses which receive the teats of the animal. In these teat-presses a series of squeezers are employed arranged one above the other. The upper squeezer in the teat-press is first brought into operation and by pressing on a small part of the teat near its upper end prevents milk from escaping upwardly into the udder. The remaining squeezers then come into operation, either simultaneously or one after the other, commencing with the upper squeezer, and by pressing on the remainder of the teat express milk into a receptacle. The number of squeezers may vary in different teat-presses to suit different lengths of teats. A device may be employed for putting out of action as many squeezers as may be necessary to adapt the press to suit the length of teat of any particular animal. All the squeezers in a teat-press are actuated from a single pulsation apparatus, means being employed to differentiate between the action of the upper and lower squeezers both in regard to time of action and in regard to pressure. The squeezers may be approximately flat slats secured upon an elastic bag. In one arrangement the slats are pressed against the teat, the top slat pressing harder upon the teat than those beneath it. In another arrangement the bag is between the teat and the flat squeezers, and encircling bands around the whole are drawn tight against the teats by the action of the bag upon the squeezers. In these forms of teat-press in which slats are employed as squeezers said slats or squeezers depend for the ratio each to the other of the different pressures which they exert upon the teat upon the differences in the area which each of them opposes to the fluid-pressure operating them as contrasted with the area which each of them presents to the teat, for the upper squeezer has a large area exposed to the fluid-pressure and a comparatively small surface contacting with the teat, and the lower squeezers have a comparatively small area exposed to the fluid-pressure and a large area which comes in contact with the teat. The lower squeezers may be provided with springs or elastic medium, which can, if desired, be adjustable, whereby the time at which they come into operation relatively to the upper squeezer is regulated.

My invention is illustrated in the accompanying drawings, wherein—

Figure 1 is a side elevation of teat-press in which approximately flat slats are employed upon the elastic bag. Fig. 2 is a corresponding plan, Fig. 3 a rear elevation, and Fig. 4 a longitudinal section on line A A, Fig. 2. Fig. 5 is a side sectional elevation of a teat-press and illustrates a rearrangement of the parts of the press shown in Fig. 1. Fig. 6 is a plan thereof; Fig. 7, a sectional elevation on B B, Fig. 6.

The elastic bag 1 is arranged within an outer cover 2 of canvas or the like, said outer cover being secured to an inflexible wall 3. Superposed slats 4, 5, and 6 are arranged upon the working face of the elastic bag 1, the lowermost of said slats being connected each to the one above it by links 7 and 8, said links maintaining the slats at desired distances apart. A rigid wall 10 is secured upon the wall 3 upon the side opposite to the pouch and has a semicircular convex face 11 of india-rubber or some similar resilient material. The slats 4, 5, and 6 severally carry the bands 12, 13, and 14, each of the bands being secured to a slat at one end, passing round the inflexible walls, and being secured to the slat at its opposite end, a space being allowed between each band and the face 11 to receive the teat. The tube 15 is secured to the pouch for the purpose of conveying fluid under pulsative pressure thereto, said tube for convenience passing through a hole 16, formed between the two walls 3 and 10. To enable the press to be adjusted to suit a shorter teat, the lower slat may be locked by hooks 9 upon opposite sides of the wall 3, which can be hooked over pins 9ᵃ upon opposite ends of the slat 6.

In the operation of milking the pouch is alternately inflated and allowed to collapse, the bands thereby being drawn upon the teat, the upper band coming first into operation to prevent the retreat of milk from the teat and the other bands following to express it therefrom. The upper band also is drawn upon the teat with a greater pressure than the lower, and to obtain this result when only one bag is employed it is necessary to use means for differentiation, one of which is shown in the figures now being described. The pressure upon any given slat is entirely dependent upon the area of that portion of the bag to which it is applied, and it is possible to so place the slats upon the bag that one receives a pressure from a larger area of the bag than the others, the upper slats collecting or receiving the pressure from a large area and the lower slats receiving the pressure from smaller areas of the bag. The squeezing pressure per unit of surface upon the teat is also increased in regard to the upper band by making it narrower in proportion to the width of the slat to which it is attached than are the bands below it in proportion to the width of their slats.

To differentiate in regard to time so that one slat shall be brought into operation in advance of another, I use the following arrangement: Restrainers 17 18 are applied upon each side of the lower slats 5 and 6, respectively. These restrainers are of elastic material and are secured to the slat at one end and at their other ends are threaded upon a rod 19, which passes through eyes 20, screwed into the wall 10. The rod 19 is continuous across the top of the teat-press and extends down upon the opposite side to hold the restrainers on that side. The eyes also serve as guides for the bands. The restrainers have the effect of restraining the slats 5 and 6, so that the upper slat 4 is first acted upon and band 12 comes into operation in advance of bands 13 and 14.

Any convenient number of slats may be used and any differentiation may be made by the means described in regard to their relative pressures and times at which they come into operation.

The press shown in Figs. 5, 6, and 7 differs from that last previously described in the arrangement of the parts. The same numerals of reference being used to indicate the same parts will allow the rearrangement to be easily followed. The flexible bag 1 is contained within the cover 2, which is secured to the rigid wall 3. The wall 10 is opposite to the wall 3 and has the resilient face 11. The bands 12, 13, and 14 and the links 7 and 8 are dispensed with, the teat being squeezed directly between the slats and the face 11, which is flat instead of semicircular, as in the arrangement previously described. The differentiation in the pressure is obtained in a similar way, the upper slat being made comparatively narrow near its middle, and the whole of the pressure of comparatively a large area of the pouch is thereby conveyed to it and through it to a correspondingly narrow length of teat. The tube 15 is employed for conveying fluid under pulsative pressure to the pouch, as previously described. The pouch is made in folds, as illustrated, in order to cause expansion of the pouch to extend regularly to the edges.

Having now particularly described and ascertained the nature of my said invention and in what manner the same is to be performed, I declare that what I claim is—

1. Apparatus for the purpose indicated comprising a teat-press having inflexible vertical walls, a flexible pouch secured to one of the said walls, and horizontal superposed slats upon said pouch, and means for conducting fluid under pulsative pressure to said pouch whereby the teat is intermittently squeezed as specified.

2. In apparatus for the purpose indicated a teat-press having inflexible vertical walls, a flexible pouch secured to one of said walls, horizontal superposed slats upon said pouch, a flexible band for each slat secured at its end thereto and elastic restrainers impeding the inflation of the lower part of the pouch, and means for conducting fluid under pulsative pressure to said pouch whereby the teat is intermittently squeezed as specified.

3. Apparatus for the purpose indicated comprising a teat-press having inflexible vertical walls, a flexible pouch secured to one of said walls, horizontal superposed slats upon said pouch, and a flexible band for each slat secured at its end thereto, and means for conducting fluid under pulsative pressure to said pouch whereby the teat is intermittently squeezed as specified.

4. Apparatus for the purpose indicated comprising a teat-press having inflexible vertical walls, a flexible pouch secured to one of said walls, horizontal superposed slats upon said pouch, and elastic restrainers impeding the inflation of the lower part of the pouch and means for conducting fluid under pulsative pressure to said pouch whereby the teat is intermittently squeezed as specified.

In testimony whereof I have signed my name to this specification in the presence of two witnesses.

GEORGE HUTCHINSON.

Witnesses:
E. P. O'DONNELL,
K. WILSON.